United States Patent Office.

HENRY F. WILLSON, OF FORT WAYNE, INDIANA, ASSIGNOR TO JACOB J. KAMM, OF SAME PLACE.

Letters Patent No. 81,721, dated September 1, 1868.

IMPROVED PAINT-COMPOUND.

*The Schedule referred to in these Letters Patent and making part of the same.*

TO ALL WHOM IT MAY CONCERN:

Be it known that I, HENRY F. WILLSON, of Fort Wayne, in the county of Allen, and State of Indiana, have invented certain new and useful Improvements in Chemically Treating Oil for Painting Purposes; and do hereby declare that the following is a full, clear, and exact description thereof, reference being had to the accompanying drawings, and to the letters of reference marked thereon, in which like letters refer to like parts in the different figures.

To enable others skilled in the arts to make and use my invention, I will proceed to describe its construction and operation.

The nature of my invention consists in so combining mineral salts with the various fat acids contained in common linseed-oil as to form a metallic vitreous compound suitable for painting purposes.

To compound my paint, make a solution of one ounce of pure carbonate of soda and one-half ounce of borate of soda to one quart of a saturated solution of hydrate of lime. Then add white lead ground in oil, at the rate of eight pounds of oil to one hundred pounds of lead, or any other metallic pigment, until the whole is of the consistency of ordinary paint. Then add to the mixture one pint of pure linseed-oil and stir well. When the chemical union has been perfected, the paint is ready for use. Paint thus prepared is impervious to water, and is fire-proof.

What I claim as new, and desire to secure by Letters Patent, is—

The combination of the above-specified ingredients, as and for the purpose specified.

H. F. WILLSON.

Witnesses:
W. B. SCHOENBEIN,
JAMES E. GRAHAM.